(12) United States Patent
Knipp

(10) Patent No.: US 7,873,679 B2
(45) Date of Patent: Jan. 18, 2011

(54) BUSINESS OBJECT DOCUMENT MAPPER

(75) Inventor: David G. Knipp, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 783 days.

(21) Appl. No.: 11/862,082

(22) Filed: Sep. 26, 2007

(65) Prior Publication Data

US 2008/0294449 A1    Nov. 27, 2008

Related U.S. Application Data

(60) Provisional application No. 60/939,338, filed on May 21, 2007.

(51) Int. Cl.
*G06F 17/30* (2006.01)

(52) U.S. Cl. ..................... 707/810; 717/108

(58) Field of Classification Search ........... None
See application file for complete search history.

(56) References Cited

U.S. PATENT DOCUMENTS

| 7,379,938 | B2 * | 5/2008 | Charters | 1/1 |
| 2006/0085243 | A1 * | 4/2006 | Cooper et al. | 705/8 |
| 2008/0126390 | A1 * | 5/2008 | Day et al. | 707/102 |
| 2008/0133303 | A1 * | 6/2008 | Singh et al. | 705/8 |
| 2008/0222171 | A1 * | 9/2008 | Charters | 707/100 |

OTHER PUBLICATIONS

Michael Rowell, Chief Architect, Open Appliations Group, The Open Application Group Integration Specification, Jun. 30, 2003, 7 pages.*
Kurt Kanaskie, The Open Applications Group and RosettaNet, Implementing OAGIS within the RosettaNet Implementation Framework Version 2.0, Version 2.0, Lucent Technologies, Inc, 2000, 33 pages.*
Michael Rowell, Using OAGIS for Integration, Oct. 24, 202, XML Journal.*

* cited by examiner

*Primary Examiner*—Don Wong
*Assistant Examiner*—Belinda Xue
(74) *Attorney, Agent, or Firm*—Felix L. Fischer

(57) ABSTRACT

In accordance with an embodiment, an architecture for directly interfacing Business Object Documents (BODs) may include a BOD mapper which employs the BOD for input and output. A model object definable by class is created corresponding to the data contained in the BOD. System logic for the local domain is provided with communication with the BOD mapper through a BOD mapper application programming interface. The logic operates on the model object and a mapping configuration is provided for relating elements of the BOD to the model object. An addressing element communicates with the BOD mapper to define the mapping configuration for the BODs operated on by the BOD Mapper for input/output and mapping for a map call and parsing for a list call is accomplished for the contents from the BOD to the model object as defined by the BOD mapping configuration.

22 Claims, 3 Drawing Sheets

BUSINESS OBJECT DOCUMENT MAPPER

REFERENCE TO RELATED APPLICATIONS

This application claims priority of U.S. Provisional Application Ser. No. 60/939,338 filed on May 21, 2007 having the same title as the present application the entirety of which is incorporated herein by reference.

COPYRIGHT NOTICE

Certain software programs or routines disclosed in this application are subject to copyright protection and all rights thereto are specifically reserved. No dedication to the public of those copyrights is intended or made by such disclosure in this specification.

FIELD

This invention relates generally to computer communications, and more particularly to improved communications axing encapsulated message passing in various applications.

BACKGROUND

The Open Applications Group Integration Specification (OAGIS) Business Object Document (BOD) standard is a method for formatting messages that are encapsulated for transport using an eXtensible Markup Language (XML) format. These messages, or BODs, may be used to send and receive various types of data between participating software systems. Although the use of XML has many benefits, the process of encapsulating a message in the XML format may require the creation of a large amount of code to convert the message data into a format that can be interpreted by a software system. For instance, if a particular BOD contains 25-30 different fields. The corresponding code to transform the contents of that BOD could easily exceed many thousands of lines of code. Such transformation code may be expensive to create, maintain, and use. Therefore, there remains a need in the art for an improved system and method for transforming BOD messages.

SUMMARY

In one or more exemplary embodiments an architecture to reduce the complexities related to producing and consuming OAGIS BODs is disclosed. Such architecture eliminates the need to write verbose, error prone, and hard to manage code by parsing the BOD and then mapping its contents to a model object defined by the interacting software system or, conversely mapping the contents of a model object in the interacting software system to a representative BOD. The architecture eliminates the need for interfacing systems to change code when an OAGIS BOD is modified. For the embodiments disclosed herein the interfacing system architecture provides a specific mapping function generally referred to as the BOD Mapper.

According to one embodiment, an architecture may include a Business Object Document (BOD) mapper employing a BOD as input and output data files that conform to an Open Applications Group Integration Specification (OAGIS) standard. A model object definable by class corresponding to the data contained in the BOD allows system logic for a local domain to communicate with the BOD mapper through a BOD mapper application programming interface (API) adapted to operate on the model object. A mapping configuration relates elements of the BOD to the model object and an addressing element communicates with the BOD mapper to define the mapping configuration for the BOD to be operated on by the BOD Mapper.

According to another embodiment, a method for interfacing of Business Object Documents (BOD) to a local domain may be accomplished by providing a BOD mapper which employs an OAGIS BOD for input and output. A model object is created corresponding to the data contained in the BOD which is definable by class. System logic is provided for the local domain which communicates with the BOD mapper through a BOD mapper application programming interface and operates on at least one model object to provide a mapping configuration for relating elements of the BOD to the model object. An addressing element is provided to communicate with the BOD mapper to define the mapping configuration, for the BODs operated on by the BOD Mapper for input/output. Mapping for a map call and parsing for a parse call is accomplished on the contents from the BOD to the model object defined by the BOD mapping configuration.

According to yet another embodiment, a method implemented in Java to process OAGIS Business Object Documents (BODs) may include creating a plurality of Java model objects that allow for the storage of data contained in each BOD and creating a BOD mapping configuration file for each mapped BOD. How the contents of the BOD should be mapped to the Java model object is determined and an application programming interface (API) written in Java is supplied that the interfacing system calls. Mapping for a map call and parsing for a parse call is then accomplished on the BOD contents based on the BOD mapping configuration. For the exemplary embodiment a mapBod Java method, a mapBodCriteria Java method and a mapResponseBod Java method, a parseBod Java method, a parseBodCriteria Java method and a parseResponseBod Java method are all defined in the BodMapper Java class.

BRIEF DESCRIPTION OF THE DRAWING FIGURES

These and other features and advantages of the present invention will be better understood by reference to the following detailed description when considered in connection with the accompanying drawings wherein.

DETAILED DESCRIPTION

Figure 1:
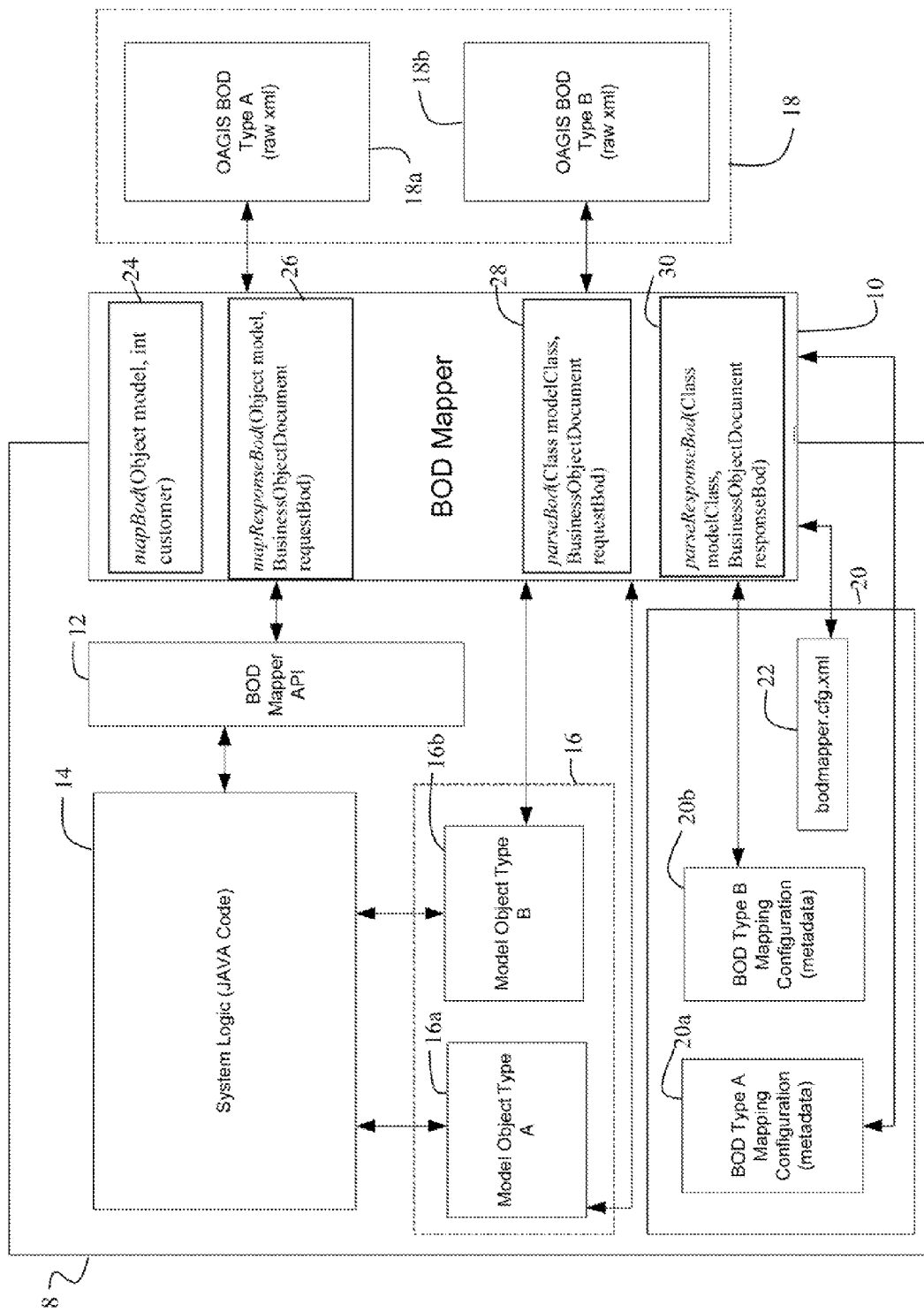
FIG. 1 is an exemplary block diagram of an overall architecture for employing the BOD Mapper, according to an embodiment.

The OAGIS Business Object Document (BOD) standard requires the involved system to have a high level of knowledge about the way a message is constructed. This requires that the same set of code be written to parse and map each BOD that the software system consumes and/or receives. In addition the code that is required to parse and map the XML in a BOD is extremely verbose and hard to maintain.

It is therefore desirable to provide an architecture to abstract all fee complexities related to producing and consuming OAGIS BODs. It is further desirable that such architecture eliminates the need to write verbose, error prone, and hard to manage code by parsing the BOD and then mapping its contents to a model object defined by the interacting software system. It is also desirable that the architecture eliminates the need for interfacing systems to change code when an OAGIS BOD is modified. For the embodiments disclosed herein the interfacing system architecture provides a specific mapping function generally referred to as the BOD Mapper. The BOD Mapper and the architecture may be implemented using a standard Java™ based framework, where Java™ is a trademark of Sun Microsystems, Inc., of Santa Clara, Calif., that reduces the effort required, to send and receive messages, while conforming to the OAGIS BOD standard. Using a standard framework shields the interfacing system from the complexities involved in parsing a BOD's XML and allows the software system to easily map a BOD's contents to a Java (model) object that is previously defined. While the examples provided for the embodiments are implemented using Java, no limitation to Java code for embodiments of the present invention is required or implied. For the Java embodiment disclosed herein the BOD Mapper utilizes one open source library, xmlbeans, available via a free license from the Apache Software Foundation, of Forest Hill, Md.

The interfacing system may first create one or more Java classes that incorporate the data contained in the BOD. The interfacing system then employs a BOD mapping configuration file providing metadata defining the mapping for each mapped BOD. This mapping directs fee BOD Mapper how the contents of fee BOD should be mapped to the Java class written by the interfacing system. The specific required elements are the model class that will be mapped to the defined BODs, the structure of the request BOD, the structure of the response BOD and how the contents of the BOD fields relate to the model object (<property>, <collection>, <component>, <subclass>). Table 1 provides an exemplary format for the configuration elements.

TABLE 1

Configuration Mapping

I. class
   a.  name - the fully qualified name of the model object
   b.  request-bod
        i.  name - the name of the static constant that represents the BOD.
        ii.  taskName - the name of the static constant that represents the task to be used..
        iii.  class - the fully qualified name of the request bod
        iv.  dataArea - the fully qualified name of the oagis data area
        v.  verb
            1.  name - the name of the verb within the bod
                a.  the name represents the name used to retrieve/set this verb on the BOD (e.g. 'get' relates to bod.getGet( ))
            2.  class - the fully qualified name of the oagis verb
            3.  select-expression -
                a.  name - a unique name assigned to this select-expression
                b.  node - the name of the node that will be mapped/parsed when responding to a request containing this select-expression.
                c.  value - contains the value of the selection expression. {0, 1, . . . } notation must be used to substitute dynamic parameters at runtime.
        vi.  noun
            1.  A noun can contain multiple sub nodes.
            2.  name - the name of the noun within the bod
                a.  the name represents the name used to retrieve/set this noun on the bod
            3.  class - the fully qualified name of the oagis noun
            4.  node
                a.  node (continuous)
                b.  name - the name of the node within the noun
                    i.  the name represents the name used to retrieve/set this node on the noun
                c.  class - the fully qualified name of the oagis node
                d.  modelRoot (true/false) - indicates that this node represents the model object as opposed to the noun (default)
                  i.  The attribute is only valid if the node is a 'root' node, meaning that it's parent is the noun definition.
        vii.  transfer
            1.  The presence of this element instructs the BOD Mapper to transfer attachments to the local path when parsing a bod.
                a.  The transfer will only occur if the BOD can contain attachments and only if there are attachments contained in the bod.
            2.  path - the path that will be used to transfer attachments TABLE 1-continued Configuration Mapping 3. pathVariable - the name of the system variable that defines the path that will be used to transfer attachments
- c. response-bod
  - i. name
  - ii. class
  - iii. dataArea
  - iv. verb
    1. name
    2. class
  - v. noun-ref
    1. Allows you to reference the noun that was defined in the request-bod.
    2. name
- d. property
  - i. name the name of the model property
    1. correlates with the getter/setter name on the model object
  - ii. bodName - the name of the BOD property
    1. correlates with the getter/setter name on the noun or node that this property is associated with
  - iii. noun - the name of the noun that this property should be mapped to
  - iv. node - the name of the node that this property should be mapped to
  - v. type - defines the type that should be used, the BOD Mapper defines the following types: (format: typeValue → (modelType, bodType))
    1. string → (String, SchemaString) (default)
    2. date → (Timestamp, ShemaDateTime|ShemaDate)
    3. boolean → (boolean, SchemaBoolean)
    4. data → (byte[ ], EmbeddedData)
    5. long → (long, SchemaLong)
    6. status → (String, Status)
    7. name → (String, Name)
    8. float → (float, SchemaFloat)
    9. int → (int, SchemaInteger)
  - vi. fileName - (true/false) denotes that this property within the mapped model object represents an attachment's file name. This is useful when the mapped model object is mapped to an instance of an OAGIS Attachment.
- e. component
  - i. name - the name of the component within the model object
    1. relates to the name on the getter/setter
  - ii. class - the fully qualified name of the model component object
  - iii. property (see property above)
- f. collection
  - i. name - the name of the collection within the model object
    1. relates to the name of the getter/setter for this collection
  - ii. node - the name of the node that this collection should be mapped to
    1. The node attribute is optional within a collection when the collection contains a property and that property is mapped to a node.
  - iii. noun - the name of the noun that this collection should be mapped
  - iv. class - the fully qualified name of the model element class that is stored within the defined collection.
  - v. adder - the name of the method that should be used to add a new element to this collection.
  - vi. property (see property above)
  - vii. collection - a collection can define a sub collection allowing the mapping of a collection that is contained by the main collection's model element (see collection above)
- g. subclass - represents a sub class of the main model class and can map all the same types of fields as the main model class.
  - i. node - the name of the node that this sub class represents(if the node attribute is not supplied then the properties of the defined subclass will be mapped/parsed to and from the root noun.)
  - ii. class - the fully qualified name of the sub class
  - iii. property (see property above)
  - iv. collection (see collection above)
  - v. component (see component above)

The BOD Mapper provides several Java methods that the interfacing system may call. In one exemplary embodiment, there are four basic methods within the BOD Mapper. A BusinessObjectDocument mapBod (Object model) provides mapping of a model object or collection of model objects to a request BOD and the BOD's type is dictated by the BOD mapping for the supplied model's class. BusinessObjectDocument mapResponseBod (Object model, BusinessObjectDocument requestBod) provides mapping of the model object or collection of model objects to a response BOD based on the supplied request BOD where the BOD's type is dictated by the BOD mapping for the supplied model's class. List parseBod (Class modelClass, BusinessObjectDocument requestBod) which parses the contents of the supplied request BOD into a list of model objects. The BOD mapping that is used to parse the contents is based on the model class that is supplied. Finally, List parseResponseBod (Class modelClass, BusinessObjectDocument responseBod) parses the contents of the supplied response BOD into a list of model objects. The BOD mapping that is used to parse the contents is based on the model class that is supplied. Examples of mapBod and parseBod are provided in the OrderService example discussed subsequently herein for the first embodiment. The mapResponseBod and parseResponseBod methods provide identical functions except they map and parse the response BOD as opposed to the initial request BOD.

Additionally, in alternative embodiments, the BOD Mapper provides a mapBodCriteria Java method defined in the BodMapper Java class and a parseBodCriteria Java method defined in the BodMapper Java class. As an exemplary embodiment, mapBodCriteria: public static BusinessObjectDocument mapBodCriteria (String selectExpressionName, String[ ] selectExpressionParams, Class modelClass) maps the select expression associated with the supplied name to the configured BOD associated with the supplied model class. The select expression parameters will be used to populate the parameters defined in the BOD Mapper XML file for the supplied model class. (e.g. {0}, {1}) The select expression parameters will be populated in ascending order with the parameters defined in the select expressions value in the BOD Mapper xml. Similarly, parseBodCriteria: public static String paresBodCtiteria (Class modelClass, BusinessObjectDocument requestBod) parses the select expression contained in the supplied BOD. The BOD Mapper then parses or maps (depending on the method called) the contents to or from the BOD defined in the selected configuration.

As shown for the exemplary embodiment in FIG. 1, BOD Mapper 10 is driven through a BOD Mapper API 12 by generalized system logic 14 in a local domain 8. The desired model objects 16, shown representatively as two types; model object type A 16a and model object type B 16b are constructs generated by the software logic to represent the domain model, e.g. the data displayed, maintained or otherwise operated on and the persistence of that data. The OAGIS BODs 18 presented to the BOD Mapper are also shown representatively in FIG. 1 as two types; BOD type A 18a and BOD type B 18b. As described previously, a mapping configuration 20 is established and provided for use by the BOD Mapper for each BOD type, BOD Type A Mapping Configuration 20a and BOD Type B Mapping Configuration 20b are accessed by the BOD Mapper for information corresponding to the two exemplary BOD types. A bodmapper.cfg.xml file 22 provides the BOD Mapper the location and names of the BOD mappings. Using the mapping configurations, the BOD(s) presented to the BOD Mapper are provided through the system as corresponding Model object(s) using the internal functions of the BOD Mapper, Map BOD 24, Parse BOD 28, Map Response BOD 26 and Parse Response BOD 30.

Figure 2:
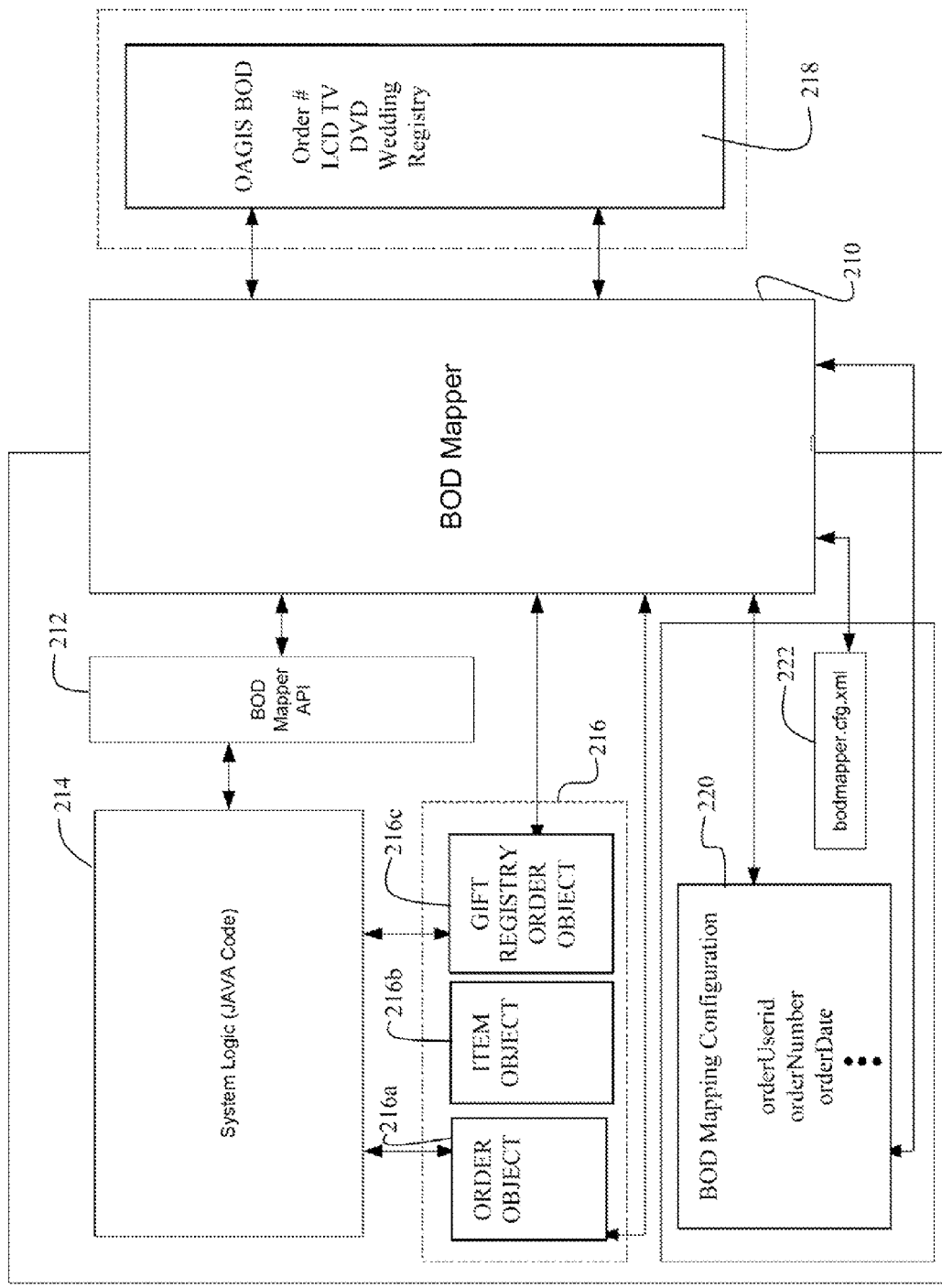
FIG. 2 is a block diagram of an exemplary implementation of the BOD Mapper to a Wedding Registry system.

Embodiments of the present invention may be used to provide various services including retail purchasing and vehicle maintenance. As an example of the implementation of the system elements described, a model for a wedding registry with the associated BOD 218, object models 216 and interfacing system logic 214 is provided as shown in FIG. 2. In the example a standard form BOD 218 with an order for two items is placed; a wide screen television and a DVD player. The BOD incorporates the item number, names of the items, descriptive data including price and capabilities. The order number as well as registry number and type are also defined in the BOD. As an example for order number 1065648 placed by a user having ID 45 on Mar. 7, 2007. A first item has item number 121, for a 40" LCD Wide Screen TV priced at $1599.99 and characterized as a LCD Wide Screen TV with 1080 pixels resolution and 6000:1 contrast ratio. A second item has item number 548, a DVD Player priced at $199.99 and characterized as a DVD Player that up-converts to 1080 pixel resolution. A gift registry is identified as having registry number 487-W and a registry type characterized as "Wedding". The exemplary BOD is shown in Table 2.

TABLE 2

```
<?xml version="1.0" encoding="utf-8" ?>
<PlaceOrder xmlns:oa="http://www.openapplications.org/oagis"
    xmlns:eg="http://xmlns.path.to.ns/example/"
    xmlns:xsi="http://www.w3.org/2001/XMLSchema-instance">
    <oa:Update />
    <eg:Order>
        <eg:OrderNum>1065648</eg:OrderNum>
        <eg:UserId>45</eg:UserId>
        <eg:OrderDate>2007-03-07T01:01:01-05:00</eg:OrderDate>
        <eg:Item>
            <eg:ItemNum>121</eg:ItemNum>
            <eg:ItemName>40" LCD Wide Screen TV</eg:ItemName>
            <eg:ItemPrice>1599.99</eg:ItemPrice>
            <eg:ItemDesc>LCD Wide Screen TV, 1080p, 6000:1 contrast ratio</eg:ItemDesc>
        </eg:Item>
        <eg:Item>
            <eg:ItemNum>548</eg:ItemNum>
            <eg:ItemName>DVD Player</eg:ItemName>
            <eg:ItemPrice>199.99</eg:ItemPrice>
            <eg:ItemDesc>DVD Player that upconverts to 1080p</eg:ItemDesc>
        </eg:Item>
        <eg:GiftRegistry>
            <eg:RegistryNumber>487-W</eg:RegistryNumber>
            <eg:RegistryType>Wedding</eg:RegistryType>
        </eg:GiftRegistry>
    </eg:Order>
</PlaceOrder>
```

The BOD configuration mapping file 220 structured as previously defined for this example corresponding to the BOD of Table 1 for the example domain in FIG. 1 is defined in Table 3.

TABLE 3

```
<?xml version="1.0" encoding="UTF-8"?>
<bod-mapping xmlns="http://boeing.com/bod/mapper">
    <class name="com.boeing.bod.mapper.example.Order" ...>
        <request-bod name="PlaceOrder" ... >
            <verb name="update" ... />
            <noun name="order" ... >
                <node name="item" ... />
                <node name="giftRegistry" ... />
            </noun>
```

TABLE 3-continued

```
        </request-bod>
        <response-bod name="PlaceOrder" ... >
            <verb name="acknowledge" ... />
            <noun-ref name="order" />
        </response-bod>
        <property name="orderNumber" bodName="orderNum" type="long" />
        <property name="orderUserId" bodName="userId"/>
        <property name="orderDate" bodName="orderDate" type="date" />
            <collection name="items" node="item"
                class="com.boeing.bod.mapper.example.Item" adder="addItem">
                <property name="itemNumber" bodName="itemNum" type="long" />
                <property name="name" bodName="itemName"/>
                <property name="price" bodName="itemPrice" type="double"/>
                <property name="description" bodName="itemDesc"/>
            </collection>
            <subclass node="giftRegistry"
class="com.boeing.bod.mapper.example.GiftRegistryOrder">
                <property name="registryNum" bodName="registryNumber"/>
                <property name="registryType" bodName="registryType"/>
            </subclass>
    </class>
</bod-mapping>
```

The class shown in Table 3 represents the primary Java model object definition that is supplied by the interfacing system. All properties that are to be mapped/parsed to the BOD are listed here. For the embodiment shown, the property name and the bodName can be different. Additionally, the 'type' defaults to a string if not defined. Each property is required to have a getter/setter in the associated model class that matches the 'name' defined. In the example, to support the 'orderNumber' property the Order class must define String getOrderNumber( ); void setOrderNumber (longorderNumber).

An order may contain many purchased items, for each item the Item class is represented as an association with the Order class. Additionally, the 'node' attribute defines how this association should be mapped within the BOD xml and the 'adder' attribute declares that BOD Mapper 210 should use the 'addItem' method on the Order class to add a specific Item to the Order when parsing from a BOD.

In the exemplary embodiment shown in the table, the Subclass represents an order placed for a gift registry. The GiftRegistryOrder must derive from the Order class and the 'node' attribute indicates that the specific properties defined by the GiftRegistryOrder class should be mapped to a specific node within the BOD xml.

The model objects 216 for the example which ultimately provide the data from the BOD through the BOD Mapper to the using system include an order object 216a, an item object 216b and a gift registry order object 216c. These objects correspond to the elements of the BOD. An exemplary order object is provided in Table 4.

TABLE 4

```
Package com.boeing.bod.mapper.example.model;
import java.sql.Timestamp;
import java.util.Set;
import java.util.HashSet;
/**
 * Order.java
 */
```

TABLE 4-continued

```
public class Order {
    private long orderNumber;
    private String orderUserId;
    private Timestamp orderDate;
    private Set<Item> items = new HashSet<Item>( );
    public Order( ) {
        //generate random order number
        this.orderNumber = (long)Math.random( );
    }
    public Set<Item> getItems( ) {
        return items;
    }
    public void setItems(Set<Item> items) {
        this.items = items;
    }
    public void addItem(Item item) {
        if(item != null) {
            this.items.add(item);
        }
    }
    public Timestamp getOrderDate( ) {
        return orderDate;
    }
    public void setOrderDate(Timestamp orderDate) {
        this.orderDate = orderDate;
    }
    public long getOrderNumber( ) {
        return orderNumber;
    }
    public void setOrderNumber(long orderNumber) {
        this.orderNumber = orderNumber;
    }
    public String getOrderUserId( ) {
        return orderUserId;
    }
    public void setOrderUserId(String orderUserId) {
        this.orderUserId = orderUserId;
    }
    /* Business methods specific to the domain */
    public void processOrder( ) { }
    public void cancelOrder( ) { }
    public void chargeOrderToUser( ) { }
}
```

The Order class sets a random order number for the object. As described herein for the exemplary code, each property defined in the order placed by the BOD must have a corresponding getter/setter that communicates the name of the property mapped in the BOD mapping configuration file. For the example shown, the property "String orderUserID" is mapped using the property <property name="orderUserid" bodName="userId"/>. The Set<Item> and setItems commands correspond to the "items" collection mapped in the BOD mapping configuration file as <collection name="items" node="items" class="com.boeing.bod.mapper.example.Item" adder="addItem". Similarly, the addItem command corresponds to the method name that was declared by the "adder" attribute on the collection within the BOD Mapping configuration file as collection names="items" node="items" class="com.boeing.bod.mapper.example.Item" adder="addItem".

The getOrderDate and setOrderDate commands correspond to the "orderDate" property mapped in the BOD Mapping Configuration file <property name="orderDate" bodName="orderDate" type="date"/>. The getOrderNumber and setOrderNumber commands correspond to the "orderNumber" property mapped in the BOD mapping configuration file as <property name="orderNumber" bodName="orderNum" type="long"/>. Finally, the getOrderUserId and setOrderUserId commands correspond to the 'orderUserId' property mapped in the BOD mapping configuration file <property name="orderUserId" bodName="userId"/>. Business methods specific to the domain are then accomplished by the object. Exemplary of such methods in the code of Table 4 are "processOrder", "cancelOrder" or "chargeOrderToUser", the functions of which are self explanatory based on the titles.

The Item object is similarly structured and is provided in example form in Table 5.

TABLE 5

```
package com.boeing.bod.mapper.example.model;
/**
 * Item.java
 *
 * A simple model object written in java that the interfacing system would
 * define to match their specific business domain.
 * @version 1.0
 * @since 5.0
 */
public class Item {
    private long itemNumber;
    private String name;
    private double price;
    private String description;
    public String getDescription( ) {
        return description;
    }
    public void setDescription(String description) {
        this.description = description;
    }
    public long getItemNumber( ) {
        return itemNumber;
    }
    public void setItemNumber(long itemNumber) {
        this.itemNumber = itemNumber;
    }
    public String getName( ) {
        return name;
    }
    public void setName(String name) {
        this.name = name;
    }
    public double getPrice( ) {
        return price;
    }
    public void setPrice(double price) {
        this.price = price;
    }
}
```

The commands getDescription and setDescription correspond to the 'itemNumber' property mapped in the BOD mapping configuration file <property name="description" bodName="itemDesc"/>. The getItemNumber and setItemNumber commands Corresponds to the 'itemNumber' property mapped in the BOD mapping configuration file <property name="itemNumber" bodName="itemNum" type="long"/>. The getName and setName commands correspond to the 'name' property mapped in the BOD mapping configuration file <property name="name" bodName="itemName"/>. While the getPrice and setPrice commands correspond to the 'price' property mapped in the BOD mapping configuration file <property name="price" bodName="itemPrice" type="double"/>.

The final object, the GiftRegisteryOrder object, is shown in example form in Table 6. As a feature of the invention shown in the exemplary embodiment, the GiftRegistryOrder class is an "extension" of the Order class. Public class GiftRegistryOrder extends Order by a Java extension concept with the "<subclass>" configuration.

TABLE 6

```
package com.boeing.bod.mapper.example.model;
/**
 * GiftRegistryOrder.java
 *
 * A simple model object written in java that the interfacing system would
 * define to match their specific business domain.
 * @since 5.0
 */
public class GiftRegistryOrder extends Order {
    private String registryNum;
    private String registryType;
    public GiftRegistryOrder( ) {
        super( );
    }
    public String getRegistryNum( ) {
        return registryNum;
    }
    public void setRegistryNum(String registryNum) {
        this.registryNum = registryNum;
    }
    public String getRegistryType( ) {
        return registryType;
    }
    public void setRegistryType(String registryType) {
        this.registryType = registryType;
    }
    /* Business methods specific to the domain */
    public void markItemsAsPurchasedOnRegistry( ) { }
}
```

For this object, the getRegistryNum and setRegistryNum commands correspond to the 'registryNum' property mapped in the BOD mapping configuration file <property name="registryNum" bodName="registryNumber"/>. The getRegistryType and returnRegistryType commands correspond to the 'registryType' property mapped in the BOD mapping configuration file <property name="registryType" bodName="registryType"/>.

The addressing element to connect the BOD Mapper with the model objects, bodmapper.cfg.xml 222, provides the location of the exemplary configuration mapping file for the example is shown in Table 7.

TABLE 7

```
<?xml version="1.0" encoding="UTF-8" ?>
<bod-mapper-config xmlns="http://boeing.com/bod/mapper/
configuration">
    <mappings>
        <mapping path="Order.bm.xml" />
    </mappings>
</bod-mapper-config>
```

The BOD of Table 2 is mapped with this simple code to the configuration mapping file Order.bm.xml of Table 3. With the configuration mapping file, objects and addressing element in place, the system logic can then process the BOD information as required. Examples of processes conducted in the present example are an ordering system and an ordering service wherein the ordering system places an order via an order service.

Java code for the ordering system for the example is shown in Table 8. The ordering system relies on the conversion of data from the BOD by the BOD Mapper into the format of the various objects as defined above. This data is then recognizable to those business methods which are specific to the domain of the example.

TABLE 8

```
package com.boeing.bod.mapper.example;
import java.sql.Timestamp;
import com.boeing.bod.mapper.example.model.GiftRegistryOrder;
import com.boeing.bod.mapper.example.model.Item;
/**
 * OrderingSystem.java
 * @version 1.0
 * @since 5.0
 */
public class OrderingSystem {
    public static void main(String[ ] args) {
        //place an example order
        new OrderingSystem( ).placeExampleOrder( );
    }
    /**
     * Place an example order via the <code>OrderService</code>
     */
    public void placeExampleOrder( ) {
        GiftRegistryOrder exampleOrder = new GiftRegistryOrder( );
        exampleOrder.setOrderUserId("45");
        exampleOrder.setOrderDate(new
Timestamp(System.currentTimeMillis( )));
        exampleOrder.setRegistryNum("487-W");
        exampleOrder.setRegistryType("Wedding");
        Item tvItem = new Item( );
        tvItem.setItemNumber(I21);
        tvItem.setName("40\" LCD Wide Screen TV");
        tvItem.setPrice(1599.99);
        tvItem.setDescription("LCD Wide Screen TV, 1080p, 6000:1
contrast ratio");
        //add the tv to the order
        exampleOrder.addItem(tvItem);
        Item dvdPlayerItem = new Item( );
        dvdPlayerItem.setItemNumber(548);
        dvdPlayerItem.setName("DVD Player");
        dvdPlayerItem.setPrice(199.99);
        dvdPlayerItem.setDescription("DVD Player that upconverts to
1080p");
        //add the dvd player to the order
        exampleOrder.addItem(dvdPlayerItem);
        //place the order via the ordering service
        new OrderService( ).sendOrder(exampleOrder);
    }
}
```

The Ordering Service process is provided by example Java code in Table 9. This example shows how tire BOD Mapper API 212 would be used to both map and parse an instance of Order to and from the 'PlaceOrder' BOD.

TABLE 9

```
package com.boeing.bod.mapper.example;
import java.util.List;
import com.boeing.bod.mapper.example.model.Order;
import com.boeing.bod.mapper.BodMapper;
import com.boeing.oagis.oa.BusinessObjectDocument;
/**
 * OrderService.java
 * @version 1.0
 * @since 5.0
 */
public class OrderService {
    public void processOrder(BusinessObjectDocument bod) {
        List<Order> orders = BodMapper.parseBod(Order.class, bod);
        for(Order order : orders) {
            order.processOrder( );
        }
    }
    public void sendOrder(Order order) {
        BusinessObjectDocument bod = BodMapper.mapBod(order);
        sendBod(bod);
    }
```

TABLE 9-continued

```
    public void sendBod(BusinessObjectDocument bod) {
        //send the bod via some bod service or messaging system
    }
}
```

In this example the OrderService would both send and receive order requests, via sendOrder and processOrder respectively. The processOrder command processes an incoming order BOD by parsing the BOD into the proper format with the BOD Mapper and then processing the order itself. A BusinessObjectDocument is simply an object that represents the corresponding BOD XML as a Java class. The details of this implementation are not included in the BOD Mapper nor is it specific to its domain. The result provided by the inventive embodiment is simply an interface that should be viewed as the XML itself. The BOD represents the received place order BOD. There could be multiple <eg: Order> nodes contained in the BOD, thus the call to parseBod will return a List of all Orders.

The sendOrder command sends the supplied Order by first mapping it to the appropriate BOD (as configured in the BOD mapping configuration) and then sending the BOD via the interlacing system's messaging system. Finally, the send-BOD command is implemented by the interfacing system since the BOD Mapper is not a full messaging system solution, but simply a mechanism for translating an OAGIS BOD to and from a system model. This example demonstrates the flexibility and power of the inventive system. The ability for the BOD Mapper to transition the OAGIS BOD into an object which is then recognizable and directly operable by the domain processing the BOD greatly simplifies the interface programming requirements.

As an additional example embodiment, a BOD Mapper as disclosed is used on a system architected as a "system of systems" solution which requires each individual sub-system to communicate with each other via OAGIS Business Object Documents (BOD). For the references in this example, the OAGIS BOD is simply a message that is defined in XML that complies with the OAGIS BOD standard. These BODs are sent between sub-systems via an Application Integration Manager (AIM) Gateway. The AIM Gateway acts as the main message bus between each sub-system, handling all the necessary routing and delivery of the BOD.

Figure 3:
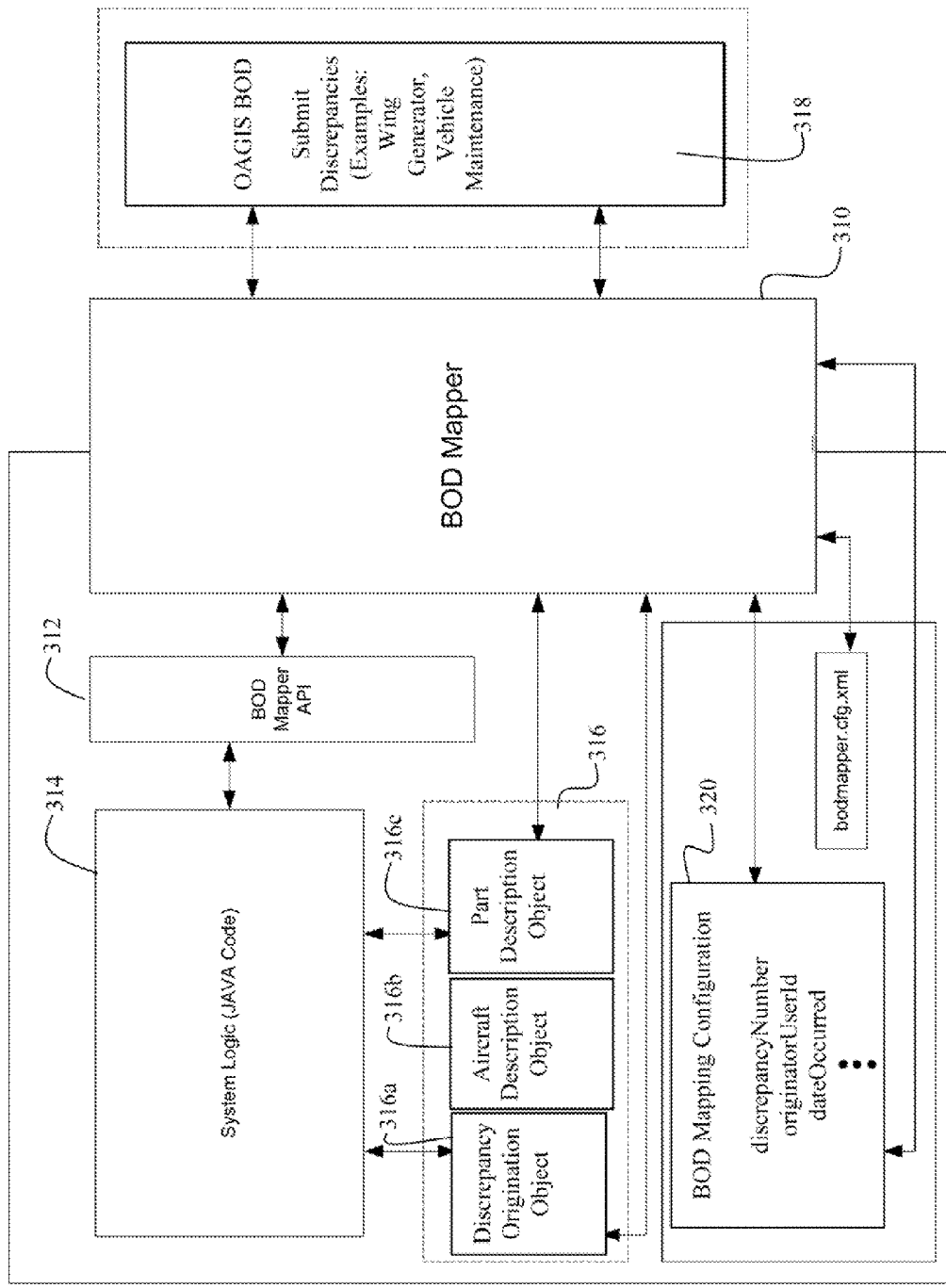
FIG. 3 is a block diagram of an implementation of the BOD Mapper to an aircraft parts discrepancy system.

Communications on this interface between the AIM Gateway and each sub-system is enhanced by the BOD Mapper capabilities. The BOD Mapper simplifies this interface by mapping the contents of a model object, written by the sub-system, to a BOD for transmission to another sub-system. An exemplary use is for communications in a Sustainment Data System (SDS) environment wherein the BOD Mapper may be used to easily integrate SDS related services for maintaining aircraft, trucks, automobiles, motorcycles, tanks, ships, hovercraft, submarines and other vehicles, weapons system, or other complex, devices. The term aircraft is meant to include any aerospace vehicle, including a spacecraft, an airplane, and a helicopter. The phrase weapon system can include any mobile or fixed weaponry requiring periodic inspection and/or maintenance. Further, a suitable weapon system may be mounted on, towed by, contained in, or associated with any of the vehicles described, above. The example shown in FIG. 3 and described herein is a brief description of elements of an aircraft discrepancy tracking system communicating over the gateway with the BOD Mapper simplifying the interface requirements on the Gateway. Submission of a discrepancy on an aircraft is accomplished via a BOD 318.

An example BOD for the discrepancy information transfer is shown in Table 10. In the code an example aircraft type, a Boeing F/A 18 Hornet has two discrepancies which are being submitted for an aft wing and a generator. The code provides all of the necessary data for the BOD including originator information, a discrepancy number, occurrence date, model numbers, part numbers and serial numbers.

TABLE 10

```
<?xml version="1.0" encoding="utf-8"?>
<SubmitDiscrepancy xmlns:oa="http://www.openapplications.org/oagis"
        xmlns:eg="http://xmlns.path.to.ns/example/"
        xmlns:xsi="http://www.w3.org/2001/XMLSchema-instance">
    <oa:Update />
    <eg:Discrepancy>
        <eg:DiscrepancyNum>1065648</eg:DiscrepancyNum>
        <eg:OriginatorUserId>45</eg:OriginatorUserId>
        <eg:DateOccurred>2007-03-07T01:01:01-05:00
        </eg:DateOccurred>
        <eg:Aircraft>
            <eg:Model>F/A-18E/F Super Hornet</eg:Model>
            <eg:TailNumber>05-12345</eg:TailNumber>
            <eg:SerialNumber>8445-878</eg:SerialNumber>
            <eg:Part>
                <eg:PartNum>121</eg:PartNum>
                    <eg:PartName>Aft Wing</eg:PartName>
                <eg:PartSerial>45647-545</eg:PartSerial>
            </eg:Part>
            <eg:Part>
                <eg:PartNum>122</eg:PartNum>
                <eg:PartName>Generator</eg:PartName>
                <eg:PartSerial>45647-546</eg:PartSerial>
            </eg:Part>
        </eg:Aircraft>
    </eg:Discrepancy>
</SubmitDiscrepancy>
```

Table 11 provides the exemplary configuration, mapping for the example to provide the primary java model object, definition that is supplied by the interfacing system

TABLE 11

```
<?xml version="1.0" encoding="UTF-8"?>
    <bod-mapping xmlns="http://boeing.com/bod/mapper">
        <class name="com.boeing.bod.mapper.example.-
        Discrepancy" ...>
            <request-bod name="SubmitDiscrepancy" ... >
                <verb name="update" ... />
                <noun name="" ... >
                    <node name="part" ... />
                    <node name="aircraft" ... />
                </noun>
            </request-bod>
            <response-bod name="SubmitDiscrepancy" ... >
                <verb name="acknowledge" ... />
                <noun-ref name="discrepancy" />
            </response-bod>
            <property name="discrepancyNumber"
            bodName="discrepancyNum" type="long" />
            <property name="originatorUserId" bodName="userId"/>
            <property name="dateOccurred" bodName="dateOccurred"
type="date" />
            <subclass node="aircraft"
class="com.boeing.bod.mapper.example.AircraftDiscrepancy">
                <property name="model" bodName="model"/>
                <property name="tailNumber" bodName="tailNumber"/>
                <property name="serialNumber" bodName="serialNumber"
                <collection name="parts" node="part"
                            class="com.boeing.bod.mapper.example.Part"
adder="addPart">
                    <property name="partNumber" bodName="PartNum"
type="long" />
                    <property name="name" bodName="PartName"/>
```

TABLE 11-continued

```
                    <property name="serialNumber"
bodName="PartSerial" />
                </collection>
            </subclass>
        </class>
</bod-mapping>
```

All properties that, should be mapped/parsed to the BOD are listed. As in the prior example, the property name and the bodName can be different. The 'type' defaults to a string if not defined. Each property is required to have a getter/setter in the associated model class that matches the 'name' defined. e.g. the Discrepancy class must have the following defined to support the 'discrepancyNumber' property: Siring getDiscrepancyNumber( ) and void setDiserepancyNumber (long discrepancyNumber). If the discrepancy involves a particular aircraft a subclass that represents a discrepancy specific to an aircraft is provided. The AircraftDiscrepancy must derive from the Discrepancy class. The 'node' attribute indicates that, the specific properties defined by tire AircraftDiscrepancy class should be mapped to a specific node within the BOD xml. An aircraft discrepancy may contain many parts involved in the discrepancy. The Part class is represented as an association with the AircraftDiscrepancy class. The 'node' attribute defines how this association should be mapped within the BOD xml. The 'adder' attribute declares that the BOD mapper should use the 'addPart' method on the AircraftDiscrepancy class to add a specific Part to the AircraftDiscrepancy when parsing from a BOD.

The model objects which provide the data relating to the BOD through the configuration mapping for this example include a discrepancy origination 316a, an aircraft description 316b for the aircraft on which the discrepancies exist and a part description 316c for use in conjunction with the discrepancy definition. Table 12 provides an example of the discrepancy object.

TABLE 12

```
package com.boeing.bod.mapper.example.model;
import java.sql.Timestamp;
/**
* Discrepancy.java
* @version 1.0
* @since 5.0
*/
public class Discrepancy {
    private long discrepancyNumber;
    private String originatorUserId;
        private Timestamp dateOccurred;
    public Discrepancy( ) {
        //generate random discrepancy number
        this.discrepancyNumber = (long)Math.random( );
    }
    public Timestamp getDateOccurred( ) {
        return dateOccurred;
    }
    public void setDateOccurred(Timestamp dateOccurred) {
        this.dateOccurred = dateOccurred;
    }
    public long getDiscrepancyNumber( ) {
        return discrepancyNumber;
    }
    public void setDiscrepancyNumber(long discrepancyNumber) {
        this.discrepancyNumber = discrepancyNumber;
    }
    public String getOriginatorUserId( ) {
        return originatorUserId;
    }
    public void setOriginatorUserId(String originatorUserId) {
```

TABLE 12-continued

```
        this.originatorUserId = originatorUserId;
    }
    /* Business methods specific to the domain */
    public void processDiscrepancy( ) { }
    public void cancelDiscrepancy( ) { }
    public void closeDiscrepancy( ) { }
}
```

Each property defined in Discrepancy must have a corresponding getter/setter that corresponds with the name of the property mapped in the BOD mapping configuration file. For instance the property String originatorUserId must be mapped via the following property <property name="originatorUserId" bodName="userId"/> in Discrepancy.bm.xml. getDateOccurred corresponds to the 'dateOccurred' property mapped in the BOD mapping configuration file <property name="dateOccurred" bodName="dateOccurred" type="date". Similarly, getDiscrepancy corresponds to the 'discrepancyNumber' property mapped in the BOD mapping configuration file<property name="discrepancyNumber" bodName="discrepancyNum" type="long"/>. Finally, getOriginatorID corresponds to the 'originatorUserId' property mapped in the BOD mapping configuration file<property name="originatorUserId" bodName="userId"/>.

The object for the aircraft discrepancy extends the discrepancy object with additional data. An example of this object is shown in Table 13.

TABLE 13

```
import java.util.HashSet;
import java.util.Set;
/**
 * AircraftDiscrepancy.java
 * @version 1.0
 * @since 5.0
 */
public class AircraftDiscrepancy extends Discrepancy {
    private String model;
    private String tailNumber;
    private String serialNumber;
    private Set<Part> parts = new HashSet<Part>( );
    public AircraftDiscrepancy( ) {
        super( );
    }
    public Set<Part> getParts( ) {
        return parts;
    }
    public void setParts(Set<Part> parts) {
        this.parts = parts;
    }
    public void addPart(Part part) {
        if(part != null) {
            this.parts.add(part);
        }
    }
    public String getModel( ) {
        return model;
    }
    public void setModel(String model) {
        this.model = model;
    }
    public String getTailNumber( ) {
        return tailNumber;
    }
    public void setTailNumber(String tailNumber) {
        this.tailNumber = tailNumber;
    }
    public String getSerialNumber( ) {
        return serialNumber;
    }
```

TABLE 13-continued

```
    public void setSerialNumber(String serialNumber) {
        this.serialNumber = serialNumber;
    }
    /* Business methods specific to the domain */
    public void repairAircraft( ) { }
}
```

In Table 13, public class AircraftDiscrepancy extends Discrepancy and includes Set<Parts> which corresponds to the 'parts' collection mapped in the BOD mapping configuration file including <collection name="parts" node="parts" class="com.boeing.bod.mapper.example.Part" adder="addPart">. Similarly, addPart corresponds to the method name that was declared by the 'adder' attribute on the collection within the BOD mapping configuration file. <collection name="parts" node="parts" class="com.boeing.bod.mapper.example.Part" adder="addPart">. The class getModel corresponds to the 'model' property mapped in the BOD mapping configuration file <property name="model" bodName="aircraftModel"/>. Similarly, getTailNumber corresponds to the 'tailNumber' property mapped in the BOD mapping configuration file <property name="tailNumber" bodName="tailNumber"/< and getSerialNumber corresponds to the 'serialNumber' property mapped in the BOD mapping configuration file <property name="serialNumber" bodName="serialNumber"/>/. The instructions specific to the domain can then operate on the data provided through translation of the BOD for required function definition such as repairing the aircraft.

The final object for part definition is shown in Table 14.

TABLE 14

```
package com.boeing.bod.mapper.example.model;
/**
 * Part.java
 *
 * @version 1.0
 * @since 5.0
 */
public class Part {
    private long partNumber;
    private String name;
    private String serialNumber;
    public long getPartNumber( ) {
        return partNumber;
    }
    public void setPartNumber(long partNumber) {
        this.partNumber = partNumber;
    }
    public String getName( ) {
        return name;
    }
    public void setName(String name) {
        this.name = name;
    }
    public String getSerialNumber( ) {
        return serialNumber;
    }
    public void setSerialNumber(String serialNumber) {
        this.serialNumber = serialNumber;
    }
}
```

In Table 14 getPartNumber corresponds to the 'partNumber' property mapped in the BOD mapping configuration file <property name="partNumber" bodName="part Number" type="long"/>, while getName corresponds to the 'name' property mapped in the BOD mapping configuration file <property name="name" bodName="part Name"/> and getSerialNumber corresponds to the 'serialNumber' property mapped in the BOD mapping configuration file <property name="serialNumber" bodName="partSerial"/>.

The local domain employs two local processes, DiscrepancySystem and DiscrepancyService. The example demonstrates how the BOD mapper API would be used to both map and parse an instance of Discrepancy to and from the 'SubmitDiscrepancy' bod. In this example the DiscrepancyService would both send and receive discrepancy submission requests, via sendDiscrepancy and processDiscrepancy respectively.

An incoming discrepancy BOD is processed by parsing the BOD into the proper format with the BOD mapper and then processing the discrepancy itself. A Business Object Document is simply an object that represents the corresponding BOD XML. The details of this implementation are not included in the BOD mapper nor is it specific to its domain. This is simply an interface that should be viewed as the xml itself. Example code to submit an example discrepancy via the DiscrepancyService is shown in Table 15.

TABLE 15

```
package com.boeing.bod.mapper.example;
import java.sql.Timestamp;
import com.boeing.bod.mapper.example.model.AircraftDiscrepancy;
import com.boeing.bod.mapper.example.model.Part;
/**
 * DiscrepancySystem.java
 *
 * @version 1.0
 * @since 5.0
 */
public class DiscrepancySystem {
    public static void main(String[ ] args) {
        //place an example discrepancy
        new DiscrepancySystem( ).submitExampleDiscrepancy( );
    }
    public void submitExampleDiscrepancy( ) {
        AircraftDiscrepancy exampleDiscrepancy = new AircraftDiscrepancy( );
        exampleDiscrepancy.setDiscrepancyNumber(1065648);
        exampleDiscrepancy.setOriginatorUserId("45");
        exampleDiscrepancy.setDateOccurred(new Timestamp(System.currentTimeMillis( )));
        exampleDiscrepancy.setModel("F/A-18E/F Super Hornet");
        exampleDiscrepancy.setTailNumber("05-12345");
        exampleDiscrepancy.setSerialNumber("8445-878");
        Part wingPart = new Part( );
        wingPart.setPartNumber(121);
        wingPart.setName("Aft Wing");
        wingPart.setSerialNumber("45647-545");
        //add the wing part to the discrepancy
        exampleDiscrepancy.addPart(wingPart);
        Part generatorPart = new Part( );
        generatorPart.setPartNumber(122);
        generatorPart.setName("Generator");
        generatorPart.setSerialNumber("45647-546");
        //add the generator part to the discrepancy
        exampleDiscrepancy.addPart(generatorPart);
        //submit the discrepancy via the discrepancy service
        new DiscrepancyService( ).sendDiscrepancy
            (exampleDiscrepancy);
    }
}
```

The DiscrepancyService class is demonstrated in Table 16 which demonstrates how the BOD mapper API would be used to both map and parse an instance of Discrepancy to and from the 'SubmitDiscrepancy' bod. In this example the DiscrepancyService would both send and receive discrepancy submission requests, via sendDiscrepancy and processDiscrepancy respectively.

TABLE 16

```
import com.boeing.oagis.oa.BusinessObjectDocument;
/**
 * DiscrepancyService.java
 * @version 1.0
 * @since 5.0
 */
public class DiscrepancyService {
    public void processDiscrepancy(BusinessObjectDocument bod) {
        List<Discrepancy> discrepancies =
            BodMapper.parseBod(Discrepancy.class, bod);
        for(Discrepancy discrepancy : discrepancies) {
            discrepancy.processDiscrepancy( );
        }
    }
    public void sendDiscrepancy(Discrepancy discrepancy) {
        BusinessObjectDocument bod = BodMapper.-
            mapBod(discrepancy);
        sendBod(bod);
    }
    public void sendBod(BusinessObjectDocument bod) {
        //send the bod via some bod service or messaging system
    }
}
```

There could be multiple <eg:Discrepancy> nodes contained in the BOD, thus the call to parseBod will return a List of all Discrepancies, sendDiscrepancy (Discrepancy discrepancy) sends the supplied Discrepancy by first mapping it to the appropriate BOD (as configured in the BOD mapping configuration) and then sending the BOD via the interfacing system's messaging system. The sendBod command is not implemented by the interfacing system since the BOD mapper is not a full messaging system solution, but simply a mechanism for translating to and from a system model.

Having now described the invention in detail as required by the patent statutes, those skilled in the art will recognize modifications and substitutions to tire specific embodiments disclosed herein. Such modifications are within the scope and intent of the present invention as defined in the following claims.

What is claimed is:

1. A system for use in communication by a computer comprising:
   a Business Object Documents (BOD) mapper employing at least one BOD as input and output data files for a computer, the at least one BOD conforming to an Open Applications Group Integration Specification (OAGIS) standard;
   at least one model object, being defined by a defined class, corresponding to data contained in the at least one BOD;
   a system logic in the computer for a local domain, the system logic configured to communicate with the BOD mapper through a BOD mapper application programming interlace (API), said system logic operating on the at least one model object;
   a BOD mapping configuration for relating elements of the at least one BOD to the at least one model object, mapping for a map call and parsing for a list call responsive to the defined class; and
   an addressing element communicating with the BOD mapper to define the mapping configuration for the at least one BOD operated on by the BOD mapper.

2. The system of claim 1 wherein the BOD mapper provides mapping of the at least one model object to a request BOD having a BOD type, the BOD type being determined by the defined class of a supplied model object.

3. The system of claim 2 wherein the BOD mapper provides mapping of the at least one model object to a response BOD based on the request BOD where the BOD type is determined by the BOD mapping configuration for the defined class of the at least one model object.

4. The system of claim 2 wherein the BOD mapper parses contents of a supplied request BOD into a list of model objects, wherein said BOD mapping configuration is used to parse contents of the supplied request BOD based on the defined class of the supplied request BOD.

5. The system of claim 1 wherein the BOD mapper parses contents of a supplied response BOD into a list of model objects, wherein said BOD mapping configuration is used to parse contents of the supplied response BOD based on the defined class of the supplied response BOD.

6. The system of claim 1 wherein the input and output files comprise a plurality of BODs and said at least one model object comprises a plurality of corresponding model objects.

7. The system of claim 1, wherein the at least one BOD provides information for services in a Sustainment Data System environment, and wherein the services include maintenance for a vehicle including at least one of, a spacecraft, an airplane, a helicopter, a truck, a tank, a ship, and a submarine.

8. The system of claim 1, wherein the at least one BOD provides information for services in a Sustainment Data System environment, and wherein the services include maintenance for a weapon system.

9. A method for interfacing of Business Object Documents (BOD) to a local domain comprising the steps of:
 providing a computer with a software program for communications including a BOD mapper which employs at least one Open Applications Group Integration Specification (OAGIS) BOD for input and output;
 creating at least one model object, being defined by a defined class, corresponding to data contained in the at least one BOD;
 providing a system logic for local domain communicating with the BOD mapper through a BOD mapper application programming interface and operating on the at least one model object;
 providing a BOD mapping configuration for relating elements of the at least one BOD to the at least one model object responsive to the defined class;
 providing an addressing element communicating with the BOD mapper to define the BOD mapping configuration for BODs operated on by the BOD mapper for data input/output; and,
 mapping for a map call and parsing for a list call contents from the at least one BOD to the at least one model object defined by the BOD mapping configuration.

10. The method as defined in claim 9 wherein model objects are created in Java.

11. The method as defined in claim 9 wherein the step of mapping for a map call and parsing for a list call comprises mapping of the at least one model object to a request BOD having a request BOD type determined by the BOD mapping configuration for the at least one model object.

12. The method as defined in claim 11 wherein the step of mapping for a map call and parsing for a list call comprises mapping of the at least one model object to a response BOD based on the request BOD, the response BOD having a response BOD type determined by the BOD mapping configuration for the at least one model object.

13. The method as defined in claim 11 wherein the step of mapping for a map call and parsing for a list call comprises parsing contents of a supplied request BOD into a list of model objects, wherein said BOD mapping configuration is used to parse the contents based on the defined class for the request BOD.

14. The method as defined in claim 12 wherein the step of parsing and mapping comprises parsing contents of a supplied response BOD into a list of model objects, wherein said BOD mapping configuration used to parse the contents is based on the defined class for the response BOD.

15. The method of claim 9 wherein the OAGIS Business Object Documents (BODs) interfacing to a local domain provide for aircraft discrepancy reporting and the step of providing a computer with a software program for communications including a BOD mapper employs a submitDiscrepancy OAGIS BOD for input;
 the step of creating at least one model object comprises creating a plurality of model objects corresponding to the data contained in the at least one BOD and being defined by the defined class; and,
 the step of providing a system logic for the local domain operates on the plurality of model objects.

16. The method of claim 15 wherein the step of creating a plurality of model objects includes the steps of:
 creating a model object for discrepancy origination data;
 creating a model object for aircraft discrepancy data; and
 creating a model object for part data.

17. The method of claim 16 wherein
 the discrepancy origination data includes a randomly assigned origination number, an originator identification, and a date of occurrence;
 the aircraft discrepancy data includes aircraft tail number and aircraft serial number; and
 the part data includes pail name, part number and part serial number.

18. The method of claim 17 wherein the model object for aircraft discrepancy data includes a parts collection mapped from the submitDiscrepancy BOD.

19. The method of claim 18 wherein the BOD mapping configuration includes an 'adder' attribute to declare that the BOD mapper should use an 'addPart' method on an Aircraft-Discrepancy class to add a specific part to a parts collection in the aircraft discrepancy object when parsing from the at least one BOD.

20. A method implemented in Java to process Open Applications Group Integration Specification (OAGIS) Business Object Documents (BODs), comprising the steps of:
 creating a plurality of Java model objects for operation in a computer as a software program for communications that allow for storage of data contained in each BOD;
 creating a BOD mapping configuration file for each mapped BOD based on a defined class;
 determining how contents of each mapped BOD should be mapped to a Java model object;
 supplying an application programming interface (API) written in Java that an interfacing system calls; and
 mapping for a map call and parsing for a parse call the contents of each mapped BOD based on the defined class.

21. The method of claim 20, further comprising wherein the parsing and mapping step includes:
 a mapBod Java method defined in a BodMapper Java class;
 a mapBodCriteria Java method defined in the BodMapper Java class;
 a mapResponseBod Java method defined in the BodMapper Java class;
 a parseBod Java method defined in the BodMapper Java class;
 a parseBodCriteria Java method defined in the BodMapper Java class; and
 a parseResponseBod Java method defined in the BodMapper Java class.

22. The method of claim 20, wherein the BOD mapping configuration file contains metadata that defines the mapping of data between the Java model object and the BOD.

* * * * *